B. D. WILLIS.
PARTY LINE TELEPHONE SYSTEM.
APPLICATION FILED NOV. 13, 1906.
1,135,643.
Patented Apr. 13, 1915.
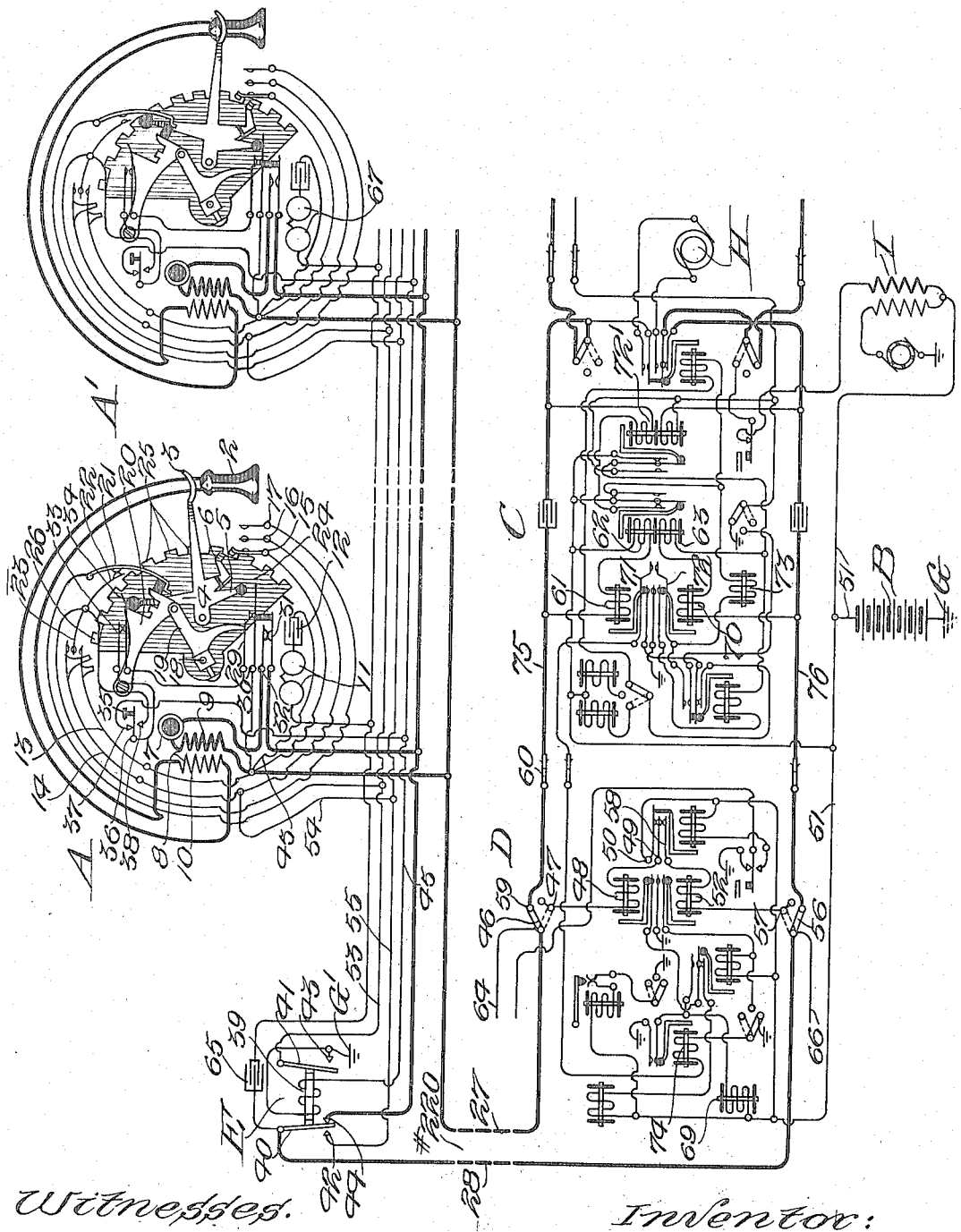
Witnesses.
Inventor:
Bernard D. Willis,
By Bulkley + Durand
Attorneys.

UNITED STATES PATENT OFFICE.

BERNARD D. WILLIS, OF CHICAGO, ILLINOIS, ASSIGNOR, BY MESNE ASSIGNMENTS, TO FIRST TRUST AND SAVINGS BANK, TRUSTEE, OF CHICAGO, ILLINOIS.

PARTY-LINE TELEPHONE SYSTEM.

1,135,643.   Specification of Letters Patent.   Patented Apr. 13, 1915.

Application filed November 13, 1906. Serial No. 343,213.

*To all whom it may concern:*

Be it known that I, BERNARD D. WILLIS, a citizen of the United States of America, and resident of Chicago, Cook county, Illinois, have invented a certain new and useful Improvement in Party-Line Telephone Systems, of which the following is a specification.

My invention contemplates an improved arrangement for preventing interference between party line subscribers in an automatic telephone exchange system—or in any system, automatic or manual or semi-automatic—employing operating grounds at the substations.

The accompanying drawing is a diagram showing two substations of my improved type connected to a line leading to an automatic central office.

The substation A is shown in an operated position, while the substation A′ is shown in normal position. The ground-controlling relay is shown in an energized condition at E. A common battery connector C and a first-selector D are located at the exchange, the latter allotted to the line of substations A and A′. A central battery is shown at B having its positive terminal preferably grounded at G. The ringing and busy signaling machines H and I are located in the central exchange.

The substations comprised in my invention may be of any suitable or approved type. The substation A comprises a receiver 2, a switch-hook 3 for controlling the substation circuits, which controlling operations are accomplished through the medium of any suitable means such as the cam arms 4, 5 and 6. The said substation comprises the usual transmitter 7, induction-coil 8 having the primary winding 9 and secondary winding 10, the ringer 11, and the condenser 12 in the ringer circuit. Being an automatic substation it is provided with the usual vertical and rotary impulse springs 13 and 14 and with the release springs 15, 16 and 17. Said substation is, of course, provided with a dial which is not shown but which is secured to the shaft 18, together with the locking dog 19. Furthermore, there is a locking cam 20 that locks the dog 19 while the receiver is on the switch-hook to prevent a rotation of the dial. The substation ground circuit extending from the ground-controlling relay E is normally broken between the ground springs 21 and 22 by the cam arm 4; but when said springs are permitted to engage, ground connection is then provided to the ground post 23 and to the release spring 17, as is well known in telephones of this type. For operating the impulse springs 13 and 14 the substation is provided with an impulse wheel 24 that is secured to the shaft 18, which wheel carries on its periphery the so-called vertical impulse teeth 25 and one rotary impulse tooth 26. The said impulse teeth are so arranged that when the dial is drawn down the impulse springs 14 and 13 are not carried into contact with the ground post 23; but as the dial returns, first the vertical teeth engage the vertical impulse spring 13, and after they have completed their work the rotary impulse tooth 26 operates the rotary impulse spring 14. In this operation the subscriber's vertical line conductor 27 is first given a number of ground impulses, and then the rotary line conductor 28 is given one ground impulse. It will be noticed that as long as the dial is out of normal position the construction is such that the dog 19 permits the primary circuit springs 29 and 30 to separate, thus preventing the impulses that are delivered to either line conductor from passing to the other. Furthermore, when the switch-hook 3 is down the cam arm 5 presses the spring 31 out of engagement with the spring 32, whereby the primary circuit is opened. Also, in the downward stroke of the switch-hook 3, the release springs 15, 16 and 17 are momentarily pressed into engagement by the cam arm 6. The springs 33 and 34 are so controlled by the cam 4 that when the switch-hook rises the said springs are pressed into engagement. The signaling device comprises the button 35 which when pressed carries the spring 36 out of engagement with the contact point 37 and into engagement with the grounded contact point 38. The substation A′ is an exact duplicate of the substation A. The relay E comprises the coil 39 which is wound to a resistance of seventy-five hundred ohms. The armatures 40 and 41 normally rest in engagement with the points 42 and 43, respectively; but when the relay becomes energized the armature 40 leaves the contact point 42 and engages the contact point 44; also, the armature 41 disengages from the contact point 43, breaking the ground circuit for all the telephones along the line, so that no substation will be able to ground the vertical or rotary line conductors in making an attempt to signal or release.

The first-selector D is of the type disclosed in United States Patent No. 815,321, granted March 13, 1906, to Keith, Erickson and Erickson. The connector C is an improvement on the connector disclosed in Patent No. 815,176, granted March 13, 1906, to Keith, Erickson and Erickson. My invention is not particularly concerned with the connector C except in a general way—that is, since the substations are of the common battery type the connector C must be one adapted to common battery work. I have, therefore, elected to disclose my invention in connection with the connector C which has been disclosed in United States patent application Serial No. 294,663. It will be sufficient to simply explain that the line relays 61 and 70 are connected directly to the conductors 75 and 76 and in multiple to one terminal of the non-grounded terminal of battery B until after a called subscriber answers. When the called subscriber answers, the back-bridge relay 72' is adapted to energize and shift the connections so as to bridge the battery B between the line relays 61 and 70 for supplying talking battery to the calling line.

The operation of my improved telephone system is as follows: Assume, for example, that the subscriber at substation A desires to establish connection with some other subscriber. He removes the receiver 2 from the switch-hook 3 and operates the dial in the well-known manner for each digit, as a result grounding the vertical and rotary line conductors 27 and 28, respectively, whereby the first-selector D and in turn the connector C become operated in the well-known manner. When the subscriber removes the receiver 2 from the switch-hook 3 the said hook rises and the cam arm 4 presses the springs 33 and 34 into engagement, whereby an energizing circuit is closed through the relay E, which circuit extends from ground G' through the coil 39, conductor 45, contact point 37 and spring 36, through the springs 33 and 34, then through the springs 29 and 30 to the vertical line conductor 27, side switch wiper 46, contact point 47, vertical line relay 48 of the first-selector D, bridge-cut-off springs 49 and 50 to the battery lead 51, thence through battery B and to ground G. The relay E upon energizing operates as previously explained. Now when the subscriber at A turns the dial the locking dog 19 is raised and the springs 29 and 30 disengage, thereby breaking the energizing circuit through the relay E. The armatures 40 and 41 then return to their normal position in engagement with the contact points 42 and 43, respectively. On the return motion of the dial the impulse springs 13 and 14 are carried into engagement with the ground post 23, thereby grounding the vertical and rotary line conductors 27 and 28, and in turn operating the vertical and rotary line relays 48 and 52 of the first-selector D in the well-known manner. The energizing circuit of the vertical relay 48 extends from ground G', contact point 43, through the armature 41, conductor 53, ground springs 21 and 22, ground post 23, vertical impulse spring 13, vertical line conductor 27, side switch wiper 46, contact point 47, vertical relay 48, bridge-cut-off springs 49 and 50 to the battery lead 51, thence from battery B to ground G. The energizing circuit through the rotary line relay 52 extends from ground G', contact point 43, through the armature 41, conductor 53, ground springs 21 and 22, ground post 23, rotary impulse spring 14, conductors 54 and 55, contact point 42, armature 40, rotary line conductor 28, side switch wiper 56, contact point 57, rotary line relay 52, bridge-cut-off springs 58, 49 and 50 to the battery lead 51, thence through battery B and to ground G. After the first-selector D has operated and the side switch passes to third position, the line conductors 27 and 28 are extended to the connector C. At the same time the energizing circuit through the relay E is again completed when the dial comes to rest and the springs 29 and 30 again engage. This time the energizing circuit is extended to the connector C as follows: From the side switch wiper 46 to contact point 59, shaft wiper 60, connector vertical line relay 61, through the winding 62 of the differential relay 63 to the battery lead 51, thence through battery B and to ground G. From the foregoing it is, therefore, obvious that the relay E is energized as soon as the switch-hook 3 rises sufficiently for the cam arm 4 to press the springs 33 and 34 into contact. Now when the dial is rotated in the course of calling a number the energizing circuit of the said relay is broken and the armature 41 falls back onto the grounded contact point 43, whereby the ground post 23 is provided with ground for grounding the vertical and rotary line conductors, as explained; but as soon as the dial returns to normal position the energizing circuit is again completed and the ground G' is again removed from the conductor 53. Hence, after the subscriber removes his receiver preparatory to calling a number and the switch-hook 3 is up, the only time that there is a ground connection at the substations A and A' occurs while the dial is out of normal position and consequently while the springs 29 and 30 are out of engagement. The subscriber at substation A may thus seize and hold the line with minimum danger of interference from the substation A' by the operation of the dial or signaling button, or by pressing the release springs into engagement upon the restoration of the receiver.

It will be noticed that the talking circuit extending from the substation A to the rotary line conductor 28 is slightly different from the calling circuit to the same conductor. The talking circuit at the substation A extends from the vertical line conductor 27 through the primary winding 9, transmitter 7, primary springs 32 and 31, contact point 44, armature 40 to the rotary line conductor 28; while the calling circuit reaches the rotary line conductor through the contact point 42 and conductor 55, as explained. The release of the central office apparatus may be brought about by grounding both line conductors 27 and 28 simultaneously, as is usually the case. My invention is arranged for this kind of release. When the subscriber restores the receiver 2 to the switch-hook 3, the said switch-hook immediately starts on its downward course, and before the switch-hook has moved very far the cam arm has removed sufficiently to allow the springs 33 and 34 to disengage, thereby breaking the energizing circuit through the relay E, whereby the ground G' is again in connection with the conductor 53. Then upon the engagement of the release springs 15, 16 and 17 the vertical and rotary line conductors 27 and 28 are again grounded simultaneously. The said ground circuit extends from ground G', through the contact point 43 and armature 41, conductor 53, through the ground springs 21 and 22 to the ground release spring 17, then through the springs 16 and 15 to the vertical line conductor 27. The ground to the rotary line conductor extends from the ground release spring 17 to the spring 16, conductor 54, conductor 55, contact point 42, armature 40, then to the rotary line conductor 28. Both line conductors 27 and 28 being grounded simultaneously, the central office switches employed by the said line are released. The release may, of course, take place either before the selector has trunked to the connector C or after. In the first case, when the vertical and rotary line conductors 27 and 28 are grounded, as explained, the line relays 48 and 52 will be energized simultaneously, and the energization of the release magnet 69 follows in a manner that is well known. If the release takes place after the selector has trunked to the connector, the grounding of the line conductors energizes the line relays 61 and 70, which causes the release of the switches in any suitable manner. When the line relays 61 and 70 energize simultaneously, the trunk-release springs 71 and 72 are brought into contact, and a trunk-release circuit is established comprising in series the release magnet 73 of the connector C and the back-release relay 74 of the first-selector D. The energization of the release magnet 73 of the connector C produces the restoration of the connector side switch and switch-shaft in a manner disclosed in the said connector patent. The energization of the back-release relay 74 of the selector D causes the release of the first-selector in the manner disclosed in said selector patent, the release circuit of which is destroyed when the grounding of the line conductors 27 and 28 is terminated and, therefore, when the line relays 61 and 70 of the connector C deënergize.

My invention is designed to operate as well when the line is called as when calling, to open the substation ground circuit after a subscriber thereon comes in on the line. There are certain classes of connectors which are so constructed that, with ordinary party-lines, the established connection may be released if a second subscriber comes in on the called line and grounds the same; and it is also for preventing this that my invention has been worked out. Assuming, therefore, that the line shown in the drawing is called, the connection is established as usual over the normal conductors 64 and 66 by the calling connector. The subscriber who answers (subscriber A for instance) energizes the cut-off relay E as soon as the springs 33 and 34 are carried into engagement, as previously explained, and over a circuit comprising one of the so-called back-bridge relays 72' to battery B. Therefore, the ground G' is temporarily cut off from all the substations on the line. The condenser 65 is provided in order that the tapping of the bells 11 and 67, and any other bells across the line, may be minimized when impulses are being delivered to the line when another subscriber is calling.

The automatic switches can be arranged on a percentage basis, so as to be less in number than the subscribers, and so as to afford automatic trunking between the lines of an exchange in which provision is made for removing the ground from all of the substations on a line as soon as one of the party-line subscribers takes down his receiver.

What I claim as my invention is:—

1. In a telephone exchange system, the combination of automatic means for trunking between calling and called subscribers, a telephone line, a plurality of substations on said line, subscribers' switch-hooks, telephones on said switch-hooks, a ground connection common to all of said substations, substation calling devices for utilizing said ground connection in sending ground impulses over the line to operate said automatic trunking means, a relay for severing the ground connection, and means for energizing said relay by the taking down of any telephone.

2. In a telephone exchange system, the combination of automatic means for trunking between calling and called subscribers, a telephone line, a plurality of substations on said line, subscribers' switch-hooks, telephones on said switch-hooks, a ground connection common to all of said substations, substation calling devices for utilizing said ground connection in sending ground impulses over the line to operate said automatic trunking means, a relay for severing the ground connection, means for energizing said relay by the taking down of any telephone, and common battery means for supplying current to the said line for both trunking and talking purposes.

3. In a telephone exchange system, the combination of a telephone line, a plurality of grounded substations on said line, switch-hooks at said substations, telephones on said switch-hooks, and automatic means for disconnecting all substations from ground by the taking down of any telephone.

4. In a telephone exchange system, the combination of a telephone line, a plurality of grounded substations on said line, switch-hooks at said substations, telephones on said switch-hooks, automatic means for disconnecting all substations from ground by the taking down of any telephone, and a central battery or source for supplying current to the said line for talking purposes.

5. In a telephone exchange system, the combination of a telephone line, a plurality of grounded substations on said line, switch-hooks at said substations, telephones on said switch-hooks, automatic means for disconnecting all substations from ground by the taking down of any telephone, and a central battery or source for supplying current to the said line for talking purposes, said automatic means including a ground-controlling relay common to all of said substations.

6. The combination of a subscriber's calling dial, a ground connection, a ground-controlling relay, a switch-hook for controlling the energizing of said relay, means by which the operation of said dial deënergizes said relay, and means by which the relay is reënergized by the restoration of the dial to normal position.

7. In a telephone system, a party-line, a plurality of grounded substations on the line, a relay controlling the continuity of the line, adapted also to control the continuity of the connection to ground from the substations, and means for energizing said relay to close the line and disconnect the substations from the ground whenever any subscriber on the line takes down his telephone.

8. In a telephone system, a party-line normally open at one point therein, a plurality of substations on said line, a relay common to all of said substations and controlling the said normally open point in the line, a connection to ground from each substation normally closed by said relay, and means for energizing said relay to cut off the ground and close the line whenever any subscriber thereon takes down his telephone.

9. In a telephone exchange system divided into groups, the combination of automatic means for trunking between calling and called subscribers, a telephone line, a plurality of substations on said line, subscribers' switch-hooks, telephones on said switch-hooks, a ground connection common to all of said substations, substation calling devices for utilizing said ground connection in sending ground impulses over the line to operate said automatic trunking means, a relay for severing the ground connection, and means for energizing said relay by the taking down of any telephone, said trunking means including switches having motion in one plane to select groups, and motion in a plane at right-angles thereto to find a line in the selected group.

10. In a telephone exchange system divided into groups, the combination of automatic means for trunking between calling and called subscribers, a telephone line, a plurality of substations on said line, subscribers' switch-hooks, telephones on said switch-hooks, a ground connection common to all of said substations, substation calling devices for utilizing said ground connection in sending ground impulses over the line to operate said automatic trunking means, a relay for severing the ground connection, means for energizing said relay by the taking down of any telephone, and common battery means for supplying current to the said line for both trunking and talking purposes, said trunking means including switches having motion in one plane to select groups, and motion in a plane at right-angles thereto to find a line in the selected group.

11. In a telephone system, a subscriber's line having a plurality of substations thereon, a subscriber's calling dial at each substation, a ground connection common to all of said substations, a ground-controlling relay, a switch hook at each substation for controlling the energizing of said relay, means by which the operation of a dial deënergizes said relay, and means by which the relay is reënergized by the restoration of the dial to normal position.

Signed by me at Chicago, Cook county, Illinois, this 8th day of November, 1906.

BERNARD D. WILLIS.

Witnesses:
EDWARD D. FALES,
ARTHUR B. SPERRY.